United States Patent Office 3,193,083
Patented July 6, 1965

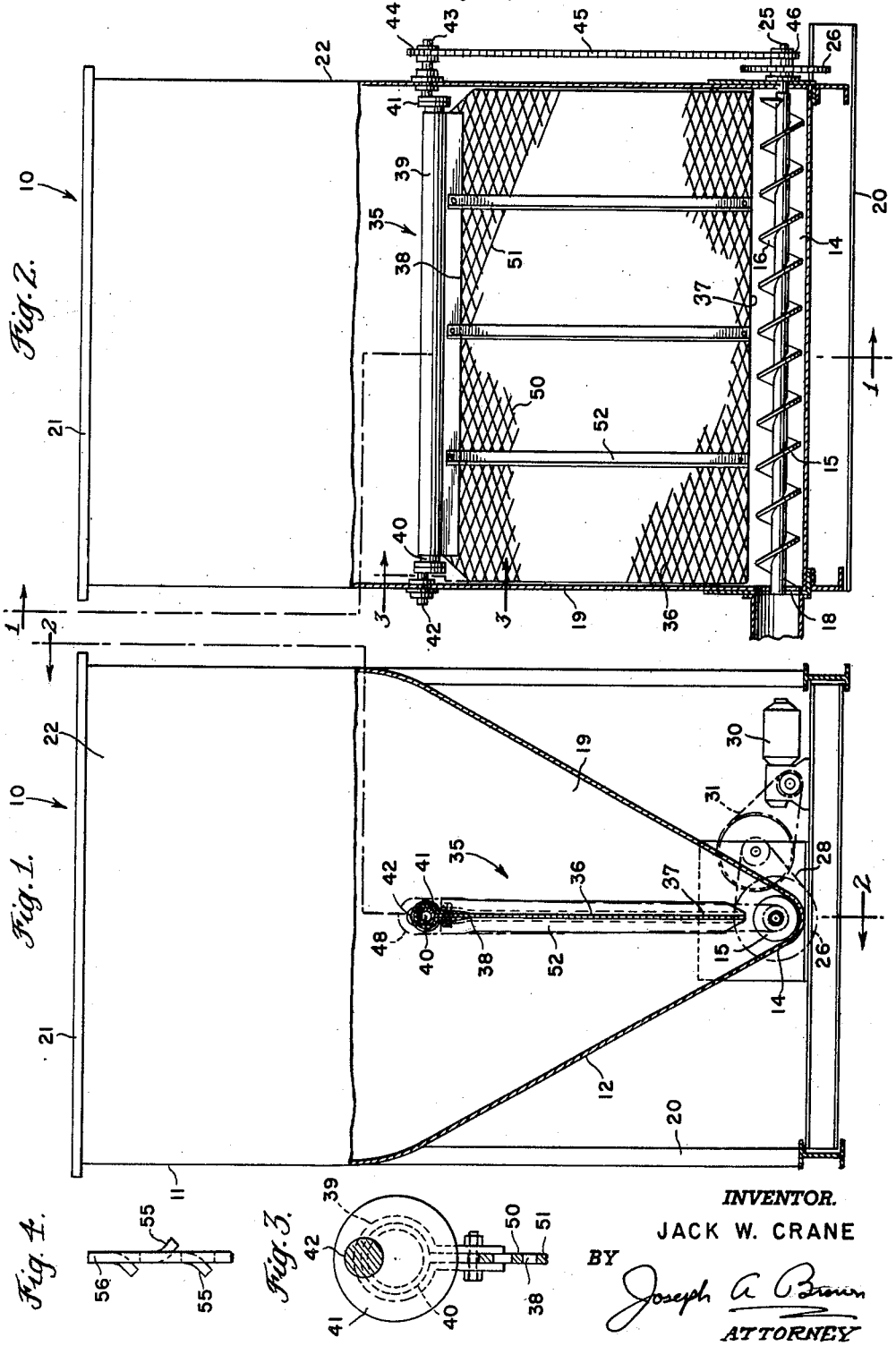

3,193,083
HOPPER-SCREW FEED
Jack W. Crane, New Holland, Pa., assignor to Sperry Rand Corporation, New Holland, Pa., a corporation of Delaware
Filed May 17, 1963, Ser. No. 281,139
6 Claims. (Cl. 198—64)

This invention relates generally to a hopper for dry fluent material such as hay pellets and more particularly to an agitator for such a hopper to prevent bridging.

In hopper constructions for dry fluent material it is conventional to provide lower walls which are inclined toward each other to direct material toward discharge means such as an auger or endless conveyor. As material is discharged from the hopper bottom, the mass of material in the hopper descends by gravity. A common problem in hoppers of this type is bridging. If the downward flow of material is temporarily stopped by the formation of a bridge, and then if the bridge breaks loose, the discharge conveyor may be damaged. This is a particular problem when the material being handled comprises hard, fairly large unit pieces, such as one or two inch square hay pellets.

A main object of this invention is to provide a non-bridging hopper of the general character described and particularly adapted for handling pelleted forage material.

Another object of this invention is to provide an agitator construction for a hopper whereby the downward flow of material during unloading is continuous and uninterrupted, the agitator being operative to exert a positive intermittent downward force on the material in the hopper.

Another object of this invention is to provide a hopper agitator of the character described which is movable in plural directions to thereby effectively overcome a variety of bridging conditions.

A further object of this invention is to provide a hopper agitator which is supported at its upper end only, a lower end of the agitator being free swinging to adapt to different unloading conditions.

A still further object of this invention is to provide a hopper and agitator of the character described which is relatively simply designed whereby it may be manufactured, assembled and repaired at low cost.

Other objects of this invention will be apparent hereinafter from the specification and from the recital in the appended claims.

In the drawing:

FIG. 1 is a partial transverse vertical section through a hopper having an agitator constructed according to this invention, the section being taken generally on the lines 1—1 of FIG. 2 looking in the direction of the arrows and the agitator being shown in a neutral depending position;

FIG. 2 is a partial longitudinal vertical section taken generally on a line 2—2 of FIG. 1 looking in the direction of the arrows;

FIG. 3 is an enlarged transverse section of the upper end of the agitator and showing the eccentric mounting means therefor; and FIG. 4 is a fragmentary end view of an agitator constructed according to another embodiment of this invention.

Referring now to the drawing by numerals of reference 10 denotes generally a hopper which comprises an upper generally rectangular section 11 and a lower V-shaped section 12. The walls of lower section 12 converge to form a bottom trough 14 in which an auger 15 is rotatable. Auger 15 has flights 16 which operate to deliver material axially toward a discharge opening 18 in an end wall 19 of the hopper.

Hopper 10 is supported on a frame 20 to extend vertically and with the trough 14 disposed horizontally. Material is adapted to be deposited in the hopper through an opening in the slot 21 of upper section 11. Dry fluent material deposited in the hopper falls by gravity toward the bottom trough 14. The side wall 22 of hopper 10, opposite wall 19, has an opening to receive a shaft 25 of auger 15. Shaft 25 carries a sprocket 26 rotatable by means of a drive chain 28 driven from a motor 30. A speed reduction train 31 is provided between motor 30 and shaft 25.

To prevent bridging of material in the hopper 10 when the material is being discharged through bottom opening 18, an agitator 35 is provided comprising a foraminous plate 36 preferably formed of expanded metal. Plate 36 extends vertically and generally along the longitudinal center of the hopper. As shown best in FIG. 2, the plate is rectangular in configuration, having an upper end 38 pivotally supported by a tube 39 swingable on a support pipe 40. Pipe 40 extends parallel to auger 15 and located in the region where upper hopper section 11 meets lower section 12. The lower end 37 of the agitator extends parallel to auger 15 and it is spaced vertically therefrom. The agitator lower end 37 is free swinging about support pipe 40, being movable either right or left of the longitudinal center of the hopper responsive to the downward movement of material therein.

Pipe 40 is carried on eccentric supports 41 including a pair of stub shafts 42 and 43. Shaft 42 is supported on hopper wall 19 while shaft 43 is supported on and projects through hopper wall 22. Shaft 43 carries a drive sprocket 44 around which an endless chain 45 extends. Chain 45 is driven by a sprocket 46 on the shaft 25 for auger 15. With this arrangement, the agitator is driven from auger 15 and when the auger is rotated the upper end 38 of the agitator is orbited about the axes of shafts 42 and 43, in a path indicated by dotted circle 48, FIG. 1.

By this orbiting, the upper end 38 of agitator 35 is moved laterally and oscillated up and down. It is the up and down movement of agitator plate 36 which is mainly utilized to prevent bridging.

As shown in FIG. 2, plate 36 has ribs 50 which are transverse to vertical and inclined downwardly and toward discharge opening 18. Intersecting these ribs is a second series of transverse ribs 51 which are inclined downwardly in a direction away from opening 18. When the upper end 38 of agitator plate 36 is orbited, the body of the plate moves up and down and the ribs 50–51 engage the material in hopper 10 and exert a positive downward force on it. If the hopper is filled with hay pellets, for example, the ribs engage the pellets on each down stroke of the agitator and push the material toward trough 14 where the auger 15 is operative to convey it through discharge opening 18. The free swinging of the lower end 37 permits the agitator to accommodate to different conditions which may result. The orbiting movement of upper end 38 produces a lateral motion which helps in loosening material in the middle of hopper 10.

To increase the strength and rigidity of agitator plate 36, vertical angle irons 52 are provided. These angle lines also function to exert a loosening action when the agitator is oscillated.

Instead of forming the plate 36 from expanded metal, the ribs may be formed by striking ribs 55 from a plate 56, FIG. 4. Preferably, ribs 55 project from opposite sides of plate 56 and extend transversely whereby they may effectively engage material in hopper 10. The transverse extension of these ribs relative to the vertical operates in the same manner as the transverse extension of the ribs 50 and 51 of plate 36 to exert a positive downward force on the material in hopper 10.

The structure described is relatively simple and inexpensive. In use, the design has been proven to be particularly effective in wholly eliminating the bridging problem of pelleted forage material. Such pellets commonly are formed in blocks one or two inches square, having a very substantial tendency to bridge when handled and discharged from a V-bottom hopper. However, with the agitator designs previously described, the bridging of material is wholly eliminated.

While this invention has been described in connection with two embodiments thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a hopper for dry fluent material, said hopper having a discharge opening in the bottom thereof, an agitator within said hopper and movable relative thereto, said agitator extending in a vertical direction and having a support pivot at an upper end and a free swinging lower end, and means for moving said support pivot both vertically and laterally relative to a fixed horizontal axis whereby said agitator is moved laterally and oscillated up and down to prevent bridging of material in the hopper.

2. The combination recited in claim 1 wherein said agitator comprises a foraminous plate extending substantially from one end of said hopper to the other and the material engaging means thereon comprising ribs.

3. The combination recited in claim 2 wherein said agitator plate is formed of a first series of diagonal ribs inclined downwardly in one direction and a second series of diagonal ribs inclined downwardly in an opposite direction and intersecting the first rib series.

4. The combination recited in claim 2 wherein said agitator is formed of an expanded metal plate.

5. The combination recited in claim 2 wherein said agitator plate has ribs formed thereon and projecting laterally therefrom, said ribs being struck from the body of the plate.

6. In combination, a hopper for dry fluent material, said hopper having a generally rectangular upper section and a V-shaped lower section forming a bottom trough, said lower section having a discharge opening in register with one end of said trough, an auger in said trough and operable on rotation to convey material for discharge through said opening, an agitator within said hopper and movable relative thereto, said agitator extending longitudinally of said hopper and in a vertical plane, horizontal means pivotally supporting said agitator at an upper end thereof, said agitator having a free lower end swingable about said upper end, rotatable eccentric means carrying said horizontal pivotal supporting means for orbital travel to move said agitator upper end in both a vertical and lateral direction, drive means for said auger, means connecting said auger to said eccentric means whereby when the auger is rotated said eccentric means is driven, and ribs on said agitator engageable with material in said hopper to exert movement thereto and prevent bridging.

References Cited by the Examiner

UNITED STATES PATENTS

| | | | |
|---|---|---|---|
| 322,952 | 7/85 | Miller | 222—232 |
| 1,790,425 | 1/31 | Johnson | 198—64 |
| 2,170,277 | 8/39 | Richardson | 198—64 |

SAMUEL F. COLEMAN, *Primary Examiner.*

ERNEST A. FALLER, *Examiner.*